June 25, 1963
W. R. LONG
3,095,230
TRAILER FOR USE IN HARVESTING OF TOBACCO
Filed Nov. 6, 1961
2 Sheets-Sheet 1
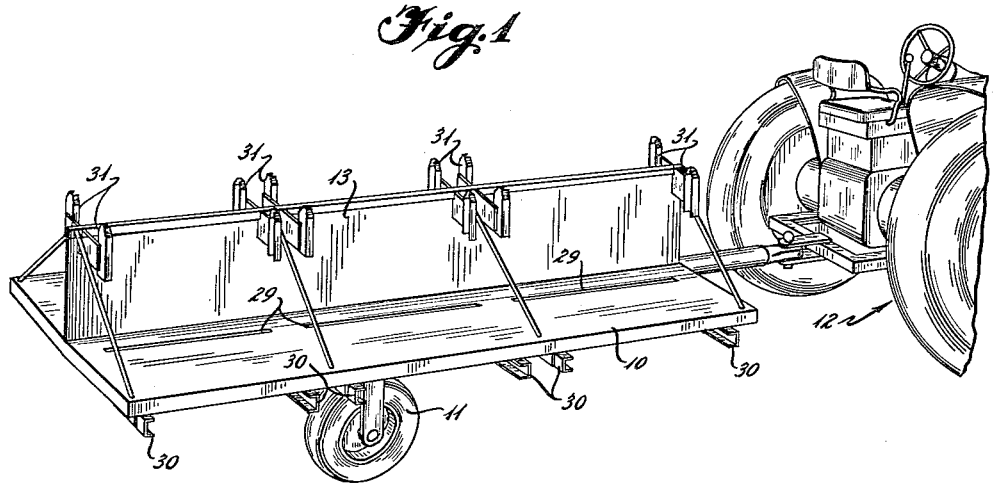
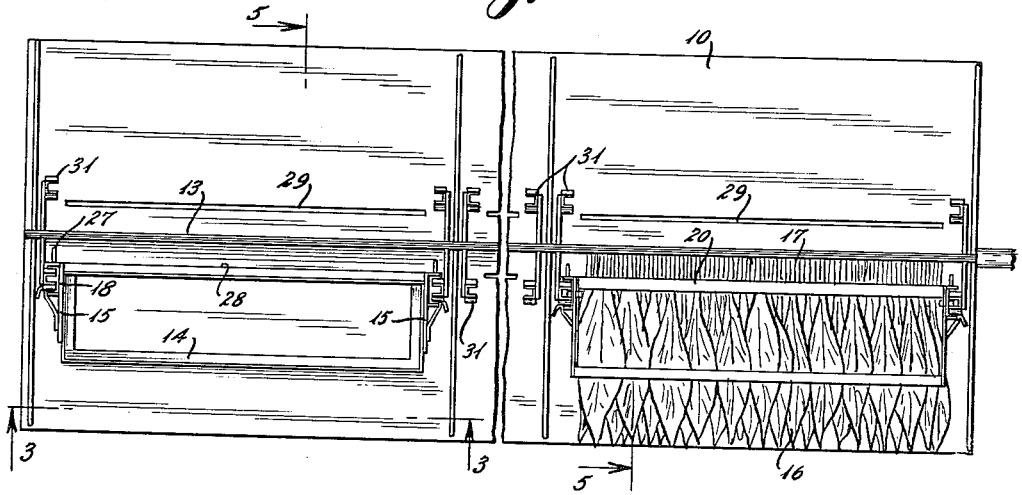
INVENTOR
William R. Long
BY
ATTORNEY

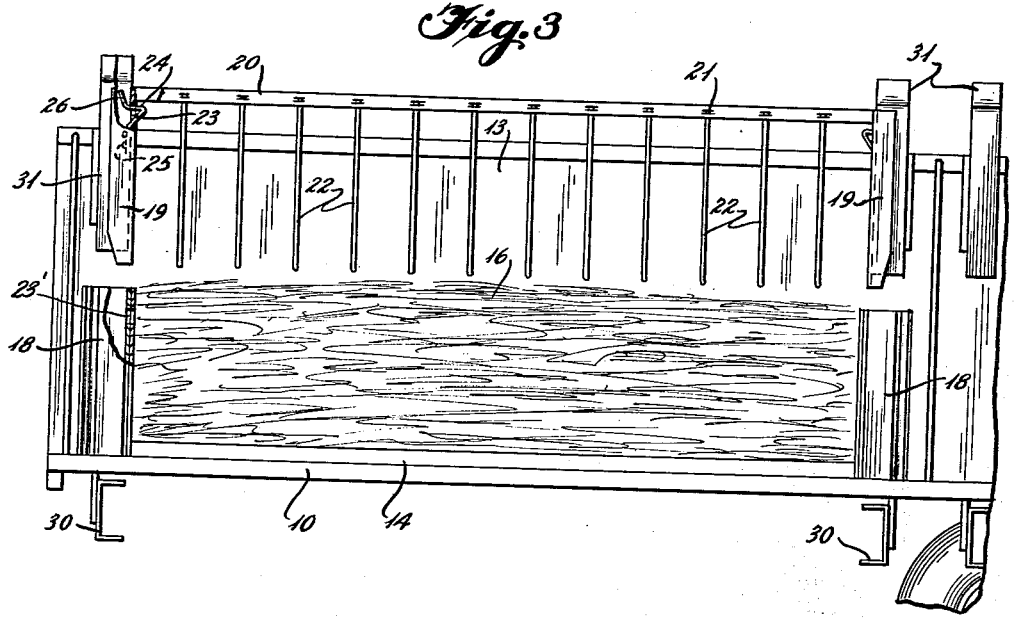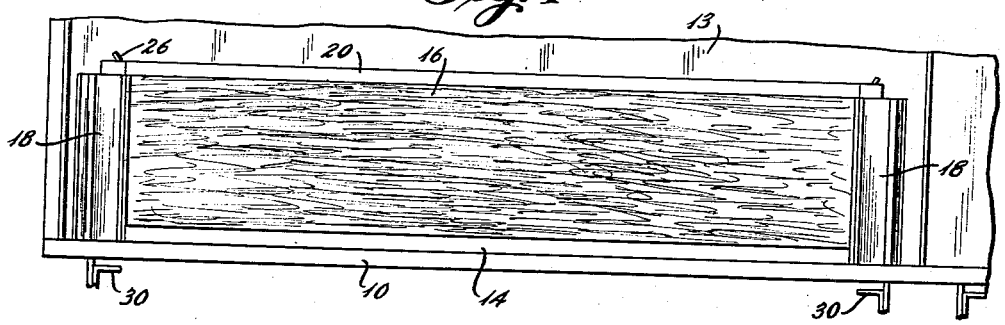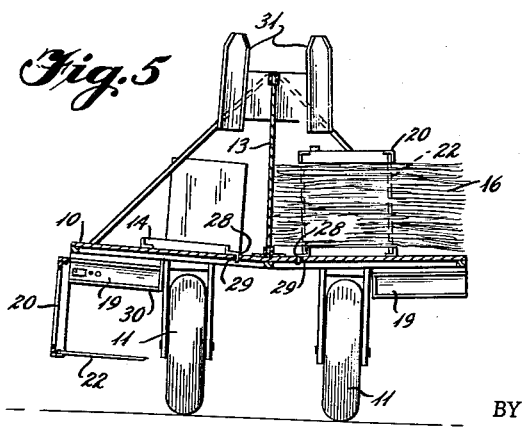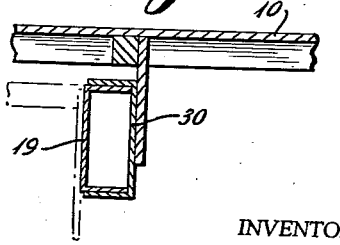

United States Patent Office 3,095,230
Patented June 25, 1963

3,095,230
TRAILER FOR USE IN HARVESTING
OF TOBACCO
William R. Long, Tarboro, N.C., assignor to Long Manufacturing Company, Tarboro, N.C.
Filed Nov. 6, 1961, Ser. No. 150,422
4 Claims. (Cl. 296—5)

This invention relates to the harvesting of tobacco by workmen in the field and to simple equipment including holders for tobacco in bulk and vehicular means for hauling said holders to a barn for curing.

The invention relates particularly to a vehicle for use by workmen in the harvesting of tobacco from growing plants in the field and to a type of tobacco stick or holder for tobacco in substantial bulk and both the trailer and holder being employed in the harvesting, and transportation of the tobacco to a barn for curing.

Tobacco has been harvested by workmen who detached the leaves of tobacco and placed them on a vehicle drawn by a domestic animal such as a mule or a horse or by a self-propelled vehicle, and the curing has been by the placing of such harvested leaves in a somewhat loose arrangement on a stick, supporting the sticks in a barn and subjecting the tobacco to heat, all of which has involved substantial time, inefficiency, and expense.

It is an object of the invention to provide a trailer or other vehicle which can be drawn through a field of growing tobacco and with multiple sticks or holders on the trailer for leaves of tobacco in substantial quantity or bulk with the holders each having a base and a top with means for fastening them together after they are filled.

Another object of the invention is to provide an improved trailer or other vehicle and holders for tobacco in bulk, which trailer or vehicle includes an upstanding wall or partition centrally along the same with cooperating means at each side thereof for the location of the lower portion of multiple holders in longitudinal alignment spaced from such wall at the desired distance so that the stems of the leaves of tobacco may be placed against the wall until the lower portion of each holder is filled and the top or retainer forced downwardly to compress the tobacco and become attached to the lower portion of the holder, the holder and vehicle being constructed for cooperative engagement, with the one portion of the holder having a guide and the other portion a guideway, and the vehicle having a cooperating portion for receiving and holding beneath the same or elsewhere the top or retainer of the holder until such time as it is needed to be applied.

Other objects and advantages of the invention will be apparent from the following description taken in conjunction with the accompanying drawing wherein:

FIG. 1 is a perspective of a vehicle in accordance with the present invention and attached to a tractor;

FIG. 2, a fragmentary top plan view of a vehicle with a filled and an empty tobacco holder;

FIG. 3, a fragmentary elevational view on the line 3—3 of FIG. 2 immediately prior to the final application of the top or retainer;

FIG. 4, a view similar to FIG. 3 with the top in place;

FIG. 5, a sectional view on the line 5—5 of FIG. 2; and

FIG. 6, a section of a supporting channel or guideway for holding the top prior to application.

Briefly stated, the invention is a vehicle for use in the harvesting of tobacco and of a construction to receive at definite locations multiple bulk holders for tobacco, each holder comprising a base and a detachably connectable top to retain tobacco compressed therein against the base, and with the top having prongs for piercing and serving to retain leaves of tobacco within the retainer, means also being provided for carrying the tops beneath the bed of the vehicle or elsewhere until they are ready to be applied, and with means for guiding the tops with regard to the holders when they are applied.

With continued reference to the drawings, a trailer or other vehicle is provided comprising a bed 10 supported on wheels 11 and drawn by a tractor 12 or otherwise propelled. The bed is of a height that workmen may easily place tobacco thereon.

Centrally of the bed is an upright wall or partition 13 which serves the dual purpose of permitting tobacco to be stacked on each side against the same and as a backboard or stop for stems of the tobacco placed thereagainst.

The bed 10 preferably has its upper surface or a portion thereof upwardly inclined from the vicinity of the center wall or partition to its outer side edge to cause the tobacco to tend to move towards the longitudinal center line of the vehicle prior to its being secured or anchored in place.

In order to handle an increased amount of tobacco, the vehicle is of a length to accommodate multiple sticks or holders of tobacco in bulk at each side of the upright wall or partition, two groups of three being shown.

Each holder for the tobacco is designed to carry a substantial mass or bulk many times the weight of tobacco previously carried on the smaller wooden tobacco stick and as a result a greater quantity of tobacco is compactly held.

The base of the holder is a generally rectangular base or frame 14 which may be hollow and of angle iron or other construction and with fixed upright ends or stanchions 15 between which the leaves of tobacco 16 are adapted to be placed with the stems 17 at the same side of the base 14 until the tobacco compressed merely by its own weight is piled a substantial distance above the upright ends or stanchions which incidentally may be of a height of 16″ or other preferred dimension.

On the outer or remote sides of the upright ends or stanchions are guideway forming channel members 18 for receiving the tongues or guides 19 of a top or cap 20 applied to retain the tobacco compressed against the base 14. The top or cap 20 likewise may be a hollow rectangular frame of angle iron construction the sides of which have struck up portions 21 along the same in which are received parallel tines or prongs 22 which overlap the base when the top is applied, some of the prongs piercing the leaves of tobacco and therefore serving to retain them in the holder.

The top may be of angle iron readily produced with the tines attached continuously by a conventional machine. The provision of the guideways and guides facilitates assembly of the base and the top by one workman unassisted, latching means being provided in the form of an opening 23 in the guide 19 and a corresponding opening 23′ in the guideway 18 for receipt of a spring latch 24 secured by fasteners 25 to the guideway forming member, said spring latch 24 having a manipulating portion 26 by which it may be released for removing the top from the holder.

The cooperating guideways 18 and guides 19 on the ends of the base 14 and top 20 of the holder are near one side of the holder, substantially midway the length of and located nearer one edge of the hoder than the other, and on such near side is a lifting eye or handle 27 whereby when the holder is in position to be filled it is placed near and parallel to an upright wall so that the leaves can be placed in the holder with the stems near to the wall. After filling the holder the top is applied and the holder with the contained tobacco leaves may be lifted by the handles 27 with the stems of the tobacco upward and the leaves extending downwardly.

In order to determine the position of the holder relative to the upright wall the base of the holder may have a depending flange 28 which can be received in slots or grooves 29 of the bed. It is intended that the holders be filled with tobacco as it is harvested, the holders being adapted to be received on the vehicle and then transported to and placed in the barn for curing.

Means is provided for the support of a retainer or top beneath the bed 10 or elsewhere adjacent each of the slots for the locating flanges of the holders so that all that is necessary after sufficient tobacco is accumulated is to remove the top or retainer from beneath the bed and apply it to the base and after the three holders are filled on each side of the vehicle there will be sufficient bulk and weight of tobacco and the vehicle can be drawn to a barn or other place for unloading prior to its return for reloading.

In order to support the tops of the holders beneath the bed at each side of the vehicle, three sets of sockets or hollow members 30 are provided spaced according to the spacing of the guides on the tops of the holders for receiving such guides in order that the tops may be carried apart from the bases of the holders until the tops are to be applied. The wheels are inset to allow room for the tops beneath the bed of the vehicle.

Locating means in the form of channels 31 are provided at each end of the holders in a manner to guide the tongue at each end of the retainer or top in its relation to the base of the holder to facilitate application of the top after a sufficient pile of tobacco has been placed on the base between the end stanchions.

What is claimed is:

1. A vehicle for use in the harvesting of tobacco comprising a wheel supported bed, an upright wall disposed centrally and longitudinally on said bed, said bed being inclined upwardly from said wall toward the outer side edges of said vehicle, a plurality of grooves in said bed adjacent to said wall, at least one tobacco holder carried by said bed and including a base and a top, a depending flange on said base receivable in one of said grooves, an upright stanchion on each end of said base, a guideway forming member on each stanchion, a guide on each end of the top for cooperative engagement with the guideway forming members, and latching means carried by said top for securing said top to said base.

2. The structure of claim 1 including means positioned beneath said bed for supporting said top when not in use.

3. The structure of claim 1 including means attached to said wall for locating said top to assist in applying the top to the base.

4. The combination of a vehicle for use in the harvesting of tobacco and at least one tobacco holder, said vehicle comprising a bed, ground engaging means supporting said bed, an upright wall disposed longitudinally substantially along the center of said bed, said holder including a base and a top, means mounting said base member on said bed member in spaced relation to said wall, said mounting means including a projection on one of said members and a receiving opening carried by the other, latch means for attaching said top to said base when the base has been filled with tobacco, and said top having a plurality of prongs engageable with the tobacco on said base for holding said tobacco in position.

References Cited in the file of this patent

UNITED STATES PATENTS

| | | |
|---|---|---|
| 1,261,201 | Arnold | Apr. 2, 1918 |
| 1,629,422 | Trulove | May 17, 1927 |